(12) United States Patent
Hawkins

(10) Patent No.: US 11,014,627 B2
(45) Date of Patent: May 25, 2021

(54) PEDAL CYCLE DRIVETRAIN AND A HUMAN POWERED VEHICLE

(71) Applicant: Farthing Technology Pty Ltd, Brookvale (AU)

(72) Inventor: David Hawkins, Brookvale (AU)

(73) Assignee: Farthing Technology Pty Ltd

( * ) Notice: Subject to any disclaimer, the term of this patent is extended or adjusted under 35 U.S.C. 154(b) by 232 days.

(21) Appl. No.: 16/096,246

(22) PCT Filed: May 4, 2017

(86) PCT No.: PCT/AU2017/050411
§ 371 (c)(1),
(2) Date: Oct. 24, 2018

(87) PCT Pub. No.: WO2017/190195
PCT Pub. Date: Nov. 9, 2017

(65) Prior Publication Data
US 2019/0162275 A1   May 30, 2019

(30) Foreign Application Priority Data
May 4, 2016  (AU) ................................ 2016901642

(51) Int. Cl.
*B62M 6/55*       (2010.01)
*B62M 11/16*      (2006.01)
(Continued)

(52) U.S. Cl.
CPC ................. *B62M 6/55* (2013.01); *B62K 1/00* (2013.01); *B62K 11/007* (2016.11); *B62M 6/45* (2013.01);
(Continued)

(58) Field of Classification Search
CPC .................................. B62K 1/00; B62M 6/55
See application file for complete search history.

(56) References Cited

U.S. PATENT DOCUMENTS 5,167,591 A * 12/1992 Cowan ................. B62M 11/145
475/211
5,242,335 A  9/1993 Kutter
(Continued)

FOREIGN PATENT DOCUMENTS

WO   2010/068101 A1   6/2010
WO   2017/190195 A1   11/2017

OTHER PUBLICATIONS

International Search Report corresponding to PCT/AU/2017/050411, dated Jun. 26, 2017, 3 pages.
(Continued)

*Primary Examiner* — Kevin Hurley
(74) *Attorney, Agent, or Firm* — Schmidt Patent Law, Inc.

(57) ABSTRACT

A pedal cycle drivetrain (1) comprising: an epicyclic gear train (3) comprising: a sun gear (11) rotatable around a main axis; a planet carrier (13) rotatable around the main axis and carrying one or more planet gears (15) meshed with the sun gear (11); and an annulus (17) rotatable around the main axis and meshed with the one or more planet gears (15). The sun gear (11), the planet carrier (13), and the annulus (17) are each exclusively in direct drive with one of: an input (5) including one or more pedals; an output (7) including a wheel hub (8) rotatable around the main axis; and a first electric motor (19). Varying angular velocity of the first electric motor (19) corresponds to a varying effective transmission ratio between the input (5) and the output (7). An example application for the pedal cycle drivetrain (1) is use as a transmission in a human powered vehicle (100, 200, 400) such as a unicycle, a recumbent bicycle, or a tricycle.

20 Claims, 12 Drawing Sheets

(51) Int. Cl.
    *B62M 6/65*     (2010.01)
    *B62K 1/00*     (2006.01)
    *B62M 6/45*     (2010.01)
    *B62K 11/00*     (2006.01)
    *F16H 3/72*     (2006.01)

(52) U.S. Cl.
    CPC .............. *B62M 6/65* (2013.01); *B62M 11/16* (2013.01); *F16H 3/725* (2013.01)

(56) References Cited

U.S. PATENT DOCUMENTS

| | | | | |
|---|---|---|---|---|
| 6,296,072 | B1* | 10/2001 | Turner | B62M 11/18 180/220 |
| 8,550,199 | B2* | 10/2013 | Moeller | B62M 6/55 180/206.3 |
| 8,651,993 | B1* | 2/2014 | Watarai | F16H 37/065 475/205 |
| 8,800,697 | B2* | 8/2014 | Hoffmann | B62J 25/00 180/21 |
| 9,114,841 | B2* | 8/2015 | Go | B62M 11/02 |
| 9,254,890 | B2* | 2/2016 | Deleval | B62M 6/55 |
| 9,511,821 | B2* | 12/2016 | Go | B62K 1/00 |
| 2012/0012412 | A1 | 1/2012 | Moeller et al. | |
| 2015/0080163 | A1 | 3/2015 | Bang | |
| 2018/0056774 | A1* | 3/2018 | Chan | B62M 11/16 |
| 2019/0331203 | A1* | 10/2019 | Mei | F16H 61/66 |
| 2020/0255087 | A1* | 8/2020 | Menichetti | B62M 6/45 |

OTHER PUBLICATIONS

Written Opinion of the International Searching Authority corresponding to PCT/AU/2017/050411, dated Jun. 16, 2017, 6 pages.
The extended European Search Report corresponding to EP17792294.5 dated Nov. 5, 2019, 5 pages.

* cited by examiner

PEDAL CYCLE DRIVETRAIN AND A HUMAN POWERED VEHICLE

CROSS REFERENCE TO RELATED APPLICATIONS

This application claims benefit of priority to PCT Patent Application PCT/AU/2017/050411 titled "A Pedal Cycle Drivetrain and a Human Powered Vehicle" and filed on May 4, 2017, which claims benefit of priority to Australian Provisional Patent Application No. 2016901642 titled "A Pedal Cycle Drivetrain and a Human Powered Vehicle" and filed on May 4, 2016, both of which are incorporated herein by reference in their entirety.

TECHNICAL FIELD

The present disclosure relates to a pedal cycle drivetrain and a human powered vehicle, such as a unicycle or bicycle, having a pedal cycle drivetrain.

BACKGROUND

Human powered vehicles including pedal cycles such as unicycles, bicycles, tricycles, etc., have been used as a mode of transportation for over a hundred years. Such vehicles may have a drivetrain that includes pedals rotatably attached to a pair of crank arms, whereby cyclic motion imparted on the pedals by an operator causes rotation of the cranks, which in turn, drive one or more wheels of the vehicle.

An example of a bicycle is the "penny-farthing" bicycle where the cranks directly drive the wheel of the front axle. The drive ratio is fixed with one revolution of the cranks equal to one revolution of the front wheel to provide a 1:1 ratio. In order to maximise vehicle speed, such bicycles characteristically have a large front wheel.

Another example of a bicycle is the safety bicycle (such as the "Rover Safety" bicycle). Such bicycles include a chain drive whereby the pedals rotatably attached to the crank drive a chainring (a front sprocket) that drives a chain. The chain, in turn, drives another sprocket (such as a rear sprocket) that drives a wheel hub of the wheel. The ratio of teeth between the chainring and the rear sprocket provides a gear ratio.

In further examples, bicycles may have multiple chainrings and rear sprockets to provide variable gear ratios. Examples of this include derailleur gear systems that allow an operator to move a chain guide to move the chain to a selected chainring and/or rear sprocket and thereby providing a selected gear ratio.

Derailleur gears, if not properly maintained and aligned, are prone to jamming and/or the chain jumping off the sprockets. The chain may also require frequent lubrication and dirt may be attracted and retained by the lubricated chain. This results in a maintenance burden. Furthermore, the lubricated chain (and dirt) may be a nuisance as it can soil skin and clothing by accidental contact during use and during maintenance activities.

A drawback of the safety bicycle design is that it requires an upright position that causes aerodynamic drag which can be a constraint on maximum speed. Several recumbent designs have been employed to reduce drag. However, the need for an extended convoluted chain run from the front of the recumbent bicycle to the back wheel can exacerbate the deficiencies of the chain drive.

Another form of pedal cycle is the unicycle. Unicycles may include a pedal rotatably attached to respective cranks, whereby the cranks directly drive the hub of the wheel. Such an arrangement usually has a fixed drive ratio/gear ratio of 1:1. Furthermore, unicycles may be difficult to use as the operator needs to balance around an additional axis compared to a bicycle.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

A pedal cycle drivetrain comprising: an epicyclic gear train, an input, an output and a first electric motor. The epicyclic gear train includes: a sun gear rotatable around a main axis; a planet carrier rotatable around the main axis and carrying one or more planet gears meshed with the sun gear; and an annulus rotatable around the main axis and meshed with the one or more planet gears. The sun gear, the planet carrier, and the annulus are each exclusively in direct drive with one of: the input including one or more pedals; the output including a wheel hub rotatable around the main axis; and the first electric motor. Varying angular velocity of the first electric motor corresponds to a varying effective transmission ratio between the input and the output.

The direct drive between components allows transfer of torque and power whilst reducing potential losses. This is in contrast to indirect drive systems that include intermediary components such as belts and chains to drive components which may result in some losses. Furthermore, chain driven systems may be exposed which can be a hazard to a user and/or risk getting contaminated or jammed. Belt or chain systems are reliant on the strength of the weakest link or belt segment and this may restrict maximum power and torque that can be applied to such systems. The arrangement of the pedal cycle drivetrain, with direct drive and integrated wheel hub, may also result in a more compact arrangement compared to other systems. Such an arrangement of the pedal cycle drivetrain may be advantageous for alternative configurations of a human powered vehicle other than conventional bicycles (such as the Rover safety bicycle). In particular, it increases the functionality of unicycles, tricycles and recumbent bicycles by providing a compact drivetrain with variable effective transmission ratio and other features described herein.

A pedal cycle drivetrain comprising: an epicyclic gear train having: a sun gear rotatable around a main axis; a planet carrier rotatable around the main axis and carrying one or more planet gears meshed with the sun gear; and an annulus rotatable around the main axis and meshed with the one or more planet gears. The pedal cycle drivetrain further comprises: an input including one or more pedals in direct drive with the planet carrier; an output including a wheel hub rotatable around the main axis, the wheel hub including, or in direct drive with, the sun gear; and a first electric motor to drive the annulus around the main axis, wherein varying angular velocity of the annulus corresponds to a varying effective transmission ratio between the input and the output.

The pedal cycle drivetrain may further comprise a controller to control the transmission ratio, wherein the controller provides a control output to cause the first electric motor to rotate the annulus at a specific angular velocity, wherein the specific angular velocity provides a required transmission ratio.

The pedal cycle drivetrain may further comprise an electric generator associated with the wheel hub to generate electrical energy from a rotating wheel hub, wherein at least part of the electrical energy from the electric generator is transferred to power the first electric motor.

The pedal cycle drivetrain may further comprise a second electric motor to rotate the wheel hub around the main axis. The electric generator may be configurable as the second electric motor.

In the pedal cycle drivetrain, the first electric motor may be configurable as a further electric generator to generate electrical energy.

The pedal cycle drivetrain may further comprise an additional generator associated with any one of the sun gear, planet carrier or the annulus to generate electrical energy.

The pedal cycle drivetrain may further comprise an energy storage device, wherein the energy storage device is configurable to receive at least part of the electrical energy from the electric generator and/or further electric generator; and wherein the energy storage device is configurable to supply electrical energy to the first and/or second motors.

The pedal cycle drivetrain may further comprise a selectively operable clutch, wherein the clutch inhibits rotation of one or more of the sun gear, planet carrier and annulus. The clutch may prevent rotation around the main axis of one of the sun gear, the planet carrier or the annulus that is in drive with the first electric motor to provide a fixed transmission ratio between the input and output.

The pedal cycle drivetrain may further comprise an additional clutch, wherein the additional clutch is selectively operable to fix relative rotation of the sun gear, planet carrier an annulus to each other.

In the pedal cycle drivetrain, at least part of the controller and energy storage device may be mounted to a wheel associated with the wheel hub.

In the pedal cycle drivetrain, the wheel hub may be in direct drive with the sun gear via a ratchet such that: torque is transferred to the output around a first direction; and reducing, limiting, or preventing torque to be transferred to the output around a second direction that is opposite to the first direction.

A unicycle comprising: a pedal cycle drivetrain as described above; a wheel associated with the output of the pedal cycle drivetrain; and a frame mounted to the pedal cycle drivetrain wherein the frame supports a user.

The unicycle may further comprise at least one inertial sensor to output inertial data; a balance controller, in a first mode, to send a balance control output based on at least the inertial data and a first set point; and the second electric motor, wherein the second electric motor rotates the wheel hub based on the balance control output to balance the unicycle around the main axis to the first set point.

In the unicycle, the first set point may correspond to a combined unicycle and user having a line of gravity that substantially intersects the main axis.

In the unicycle, the balance controller may operate in a second mode to traverse in a direction of travel by sending a second control output based on at least the inertial data and a second set point. The second electric motor may rotate the wheel hub based on the second control output to balance the unicycle around the main axis to the second set point, wherein the second set point corresponds to a combined unicycle and user having a centre of mass that is forward of the main axis along the direction of travel.

In the unicycle, the balance controller may operate in a third mode to traverse in a direction of travel, by sending a third control output based on at least the inertial data and a third set point. The second electric motor may apply torque to the wheel hub, based on the third control output, to balance the unicycle around the main axis to the third set point, wherein the third set point corresponds to a combined unicycle and user having a centre of mass that is rearward of the main axis along the direction of travel.

The unicycle may further comprise a set point controller to determine one or more of the modes based on input from a user interface and/or data from the at least one or more inertial sensors, wherein an indication of the one or more modes are sent to the balance controller.

In a further example, the set point controller further determines one or more of the set points based on input from the user interface, data from the at least one or more inertial sensors, and/or the determined mode, wherein the one or more set points are sent to the balance controller.

A human powered vehicle comprising a pedal cycle drivetrain described above. The human powered vehicle may be a recumbent bicycle.

BRIEF DESCRIPTION OF DRAWINGS

Examples of the present disclosure will be described with reference to.

DESCRIPTION OF EMBODIMENTS

Overview

Figure 1:
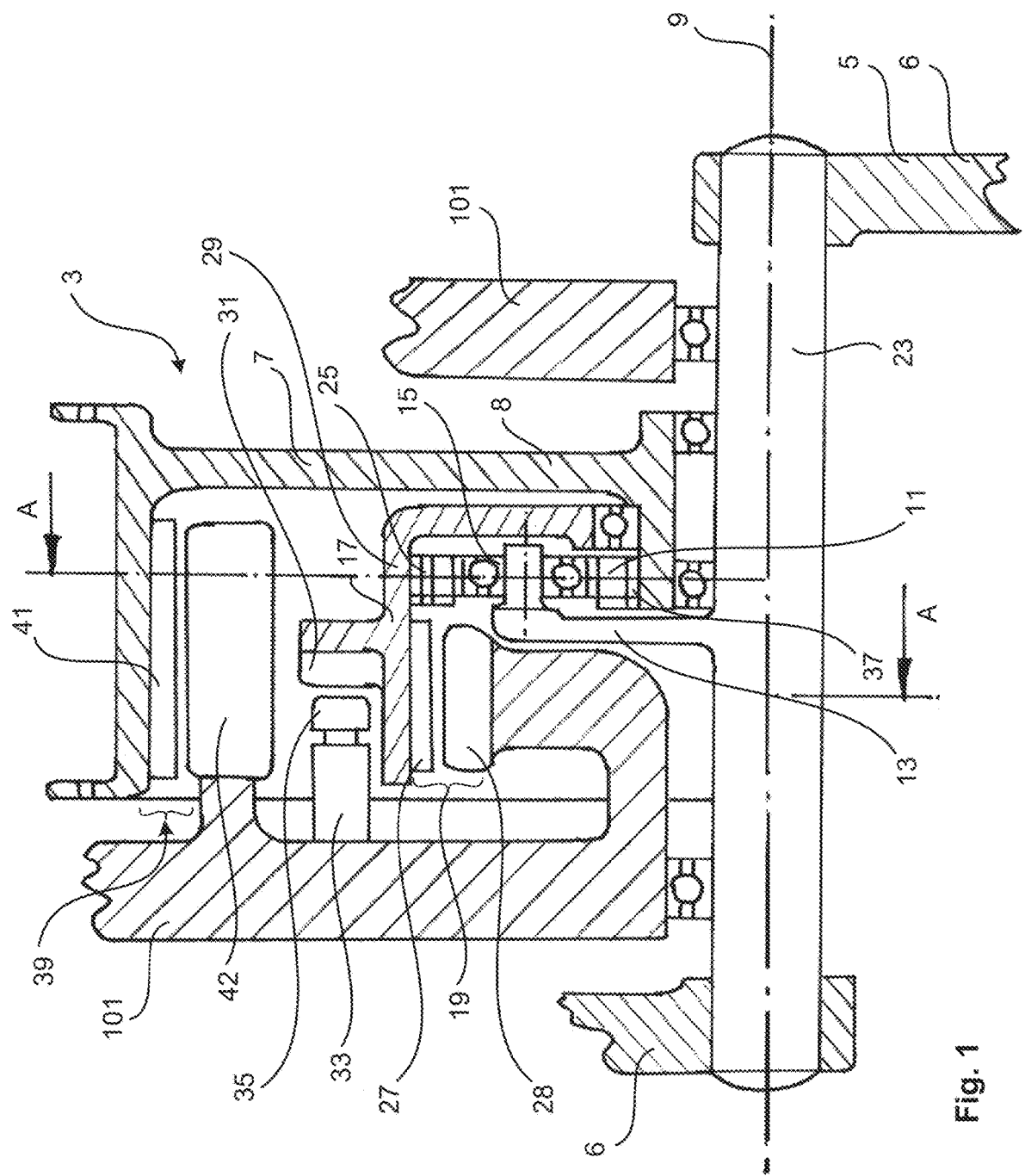
FIG. 1 is a cross-sectional view of a pedal cycle drivetrain.
Figure 9:
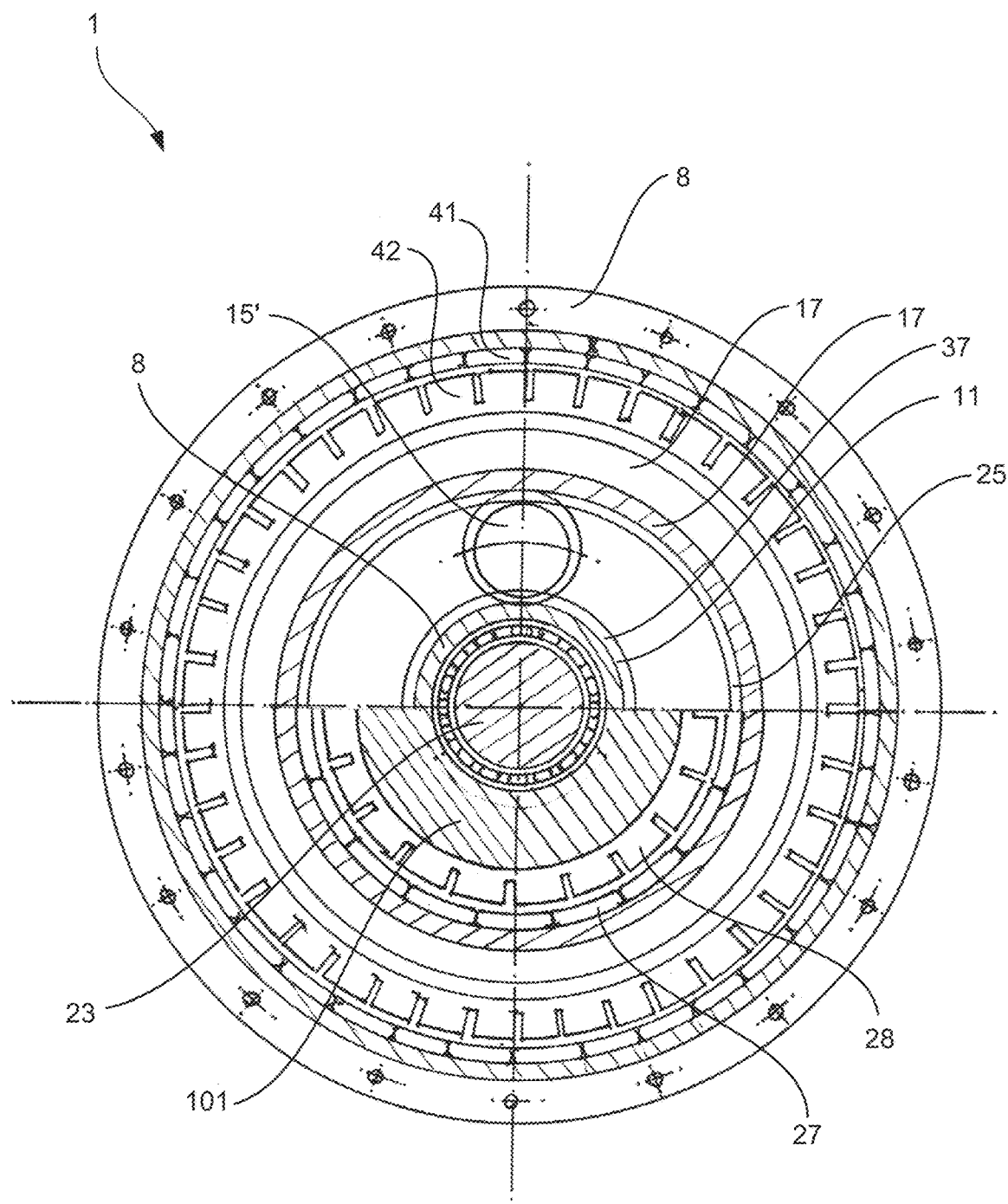
FIG. 9 illustrates a cross-sectional view of the pedal cycle drivetrain in FIG. 1 across A-A.

FIGS. 1 and 9 illustrate an example of a pedal cycle drivetrain 1 that includes an epicyclic gear train 3 between an input 5 and an output 7. The input 5 may include one or more pedals rotatably attached to one or more corresponding cranks 6. The output 7 may include a wheel hub 8 rotatable around a main axis 9.

The epicyclic gear train 3 includes: a sun gear 11 rotatable around the main axis 9, a planet carrier 13 rotatable around the main axis 9 and carrying one or more planet gears 15 meshed with the sun gear 11, and an annulus 17 rotatable around the main axis 9 and meshed with the one or more planet gears 15.

The sun gear 11, planet carrier 13, and the annulus 17 may each be exclusively in direct drive with one of the input 5, the output 7, or a first electric motor 19. Preventing rotation of one of the sun gear 11, planet carrier 13, and the annulus 17 that is not in direct drive with the input 5 or output 7 may provide a fixed effective transmission ratio between the input 5 and the output 7.

Furthermore, the first electric motor 19, that is in direct drive with one of the components of the epicyclic gear train 3 (and is not in direct drive with the input 5 and output 7) may be driven such that varying a rotation velocity of the first electric motor corresponds to varying effective transmission ratio between the input 5 and the output 7.

Figure 2:
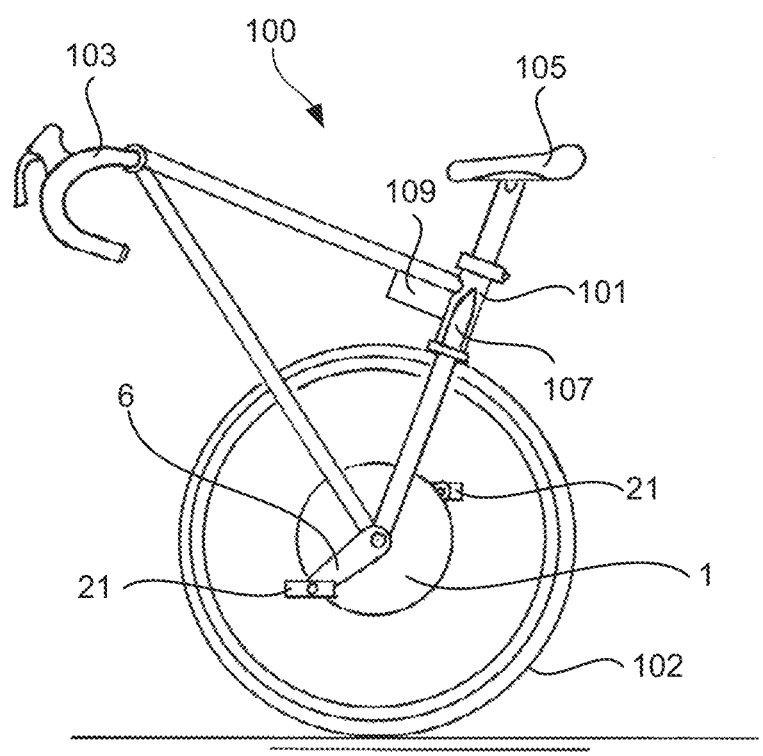
FIG. 2 is a side view of a unicycle.

FIG. 2 illustrates a human powered vehicle including the pedal cycle drivetrain 1. The human powered vehicle in this example is in the form of a unicycle 100 that includes a frame 101 mounted to the drivetrain 1 where the output 7 of the drivetrain 1 is associated with a wheel 102. The frame 101 supports a user of the unicycle 100 and in this example the frame 101 includes handlebars 103 and a saddle 105. The unicycle 100 may therefore have a variable effective transmission ratio which may assist the user to ride in varying conditions by selecting one of the infinitely variable effective transmission ratios for those conditions. For example a low effective transmission ratio may be suitable for riding up a steep incline and a high effective transmission ratio may be suitable for high speeds.

Figure 3:
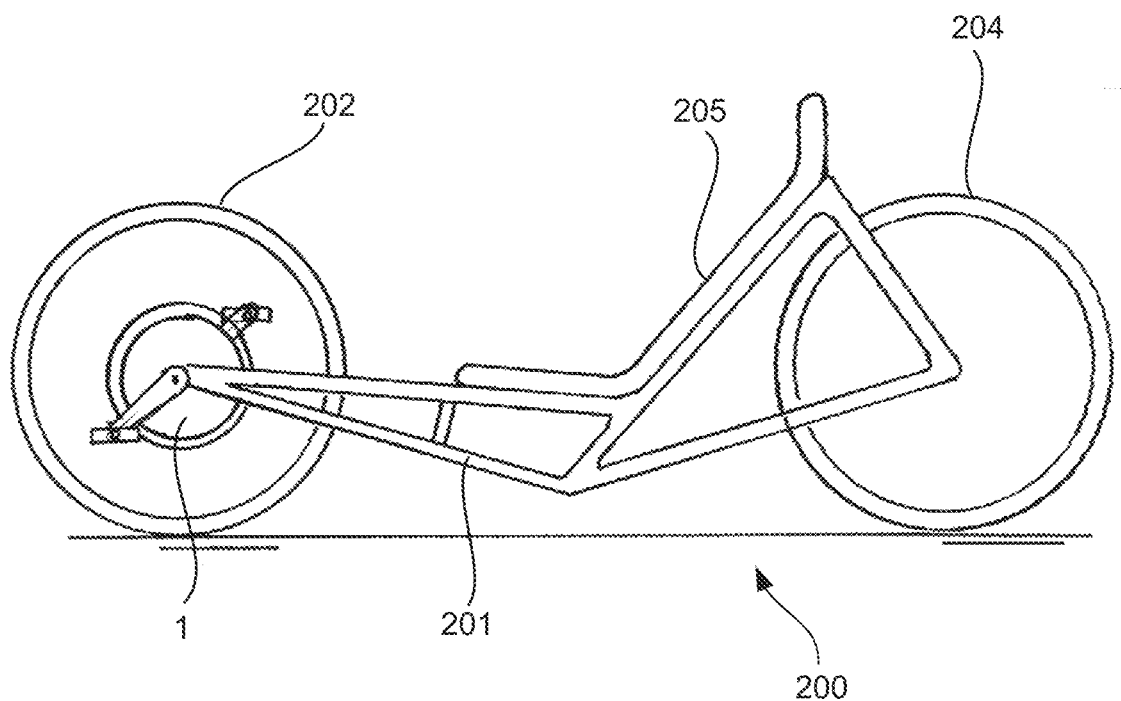
FIG. 3 is a side view of a recumbent bicycle.

FIG. 3 illustrates another human powered vehicle in the form of a recumbent bicycle 200 or tricycle having a frame 201 and a pedal cycle drivetrain 1 to drive a wheel 202. One or more additional wheels 204 are also attached to the frame 201 and a seat 205 is provided to support the user.

The pedal cycle drivetrain 1 does not include a chain between the input (such as from the pedals) and the output (such as the wheel hub). This ameliorates the issues associated with a chain driven systems, such as the exposed chain used in derailleur gears as discussed above. Furthermore the pedal cycle drivetrain 1 may allow a continuously variable effective transmission ratio, which may be in contrast with derailleur gears where the ratios are changed in set increments.

A detailed description of an example of a pedal cycle drivetrain 1 will now be presented.

The Pedal Cycle Drivetrain 1

The illustrated example of FIG. 1 shows one configuration of the components of epicyclic gear train 3 in the drivetrain 1. The input 5 is in direct drive with the planet carrier 13 and the output 7 is in direct drive with the sun gear 11. It is to be appreciated that the wheel hub 7 may include the sun gear 11. In this example the first electric motor 19 drives the annulus 17 around the main axis so that varying angular velocity of the annulus 17 corresponds to a varying effective transmission ratio between the input 5 and the output 7. This example will be described from the input 5 to the output 7.

The input 5 includes a pair of pedals 21, where each pedal 21 is rotatably attached to a respective crank 6. The two cranks 6 are fixed to opposite sides of a spindle 23 that rotates around the main axis 9, and the cranks extend from the spindle 23 in opposite directions. The spindle 23 is fixed to the planet carrier 13 such that rotation of the spindle 23 causes a corresponding rotation of the planet carrier 13. In some examples, the spindle 23 may be welded to the planet carrier 13, mounted to the planet carrier 13, or integrally formed with the planet carrier 13.

Figure 4:
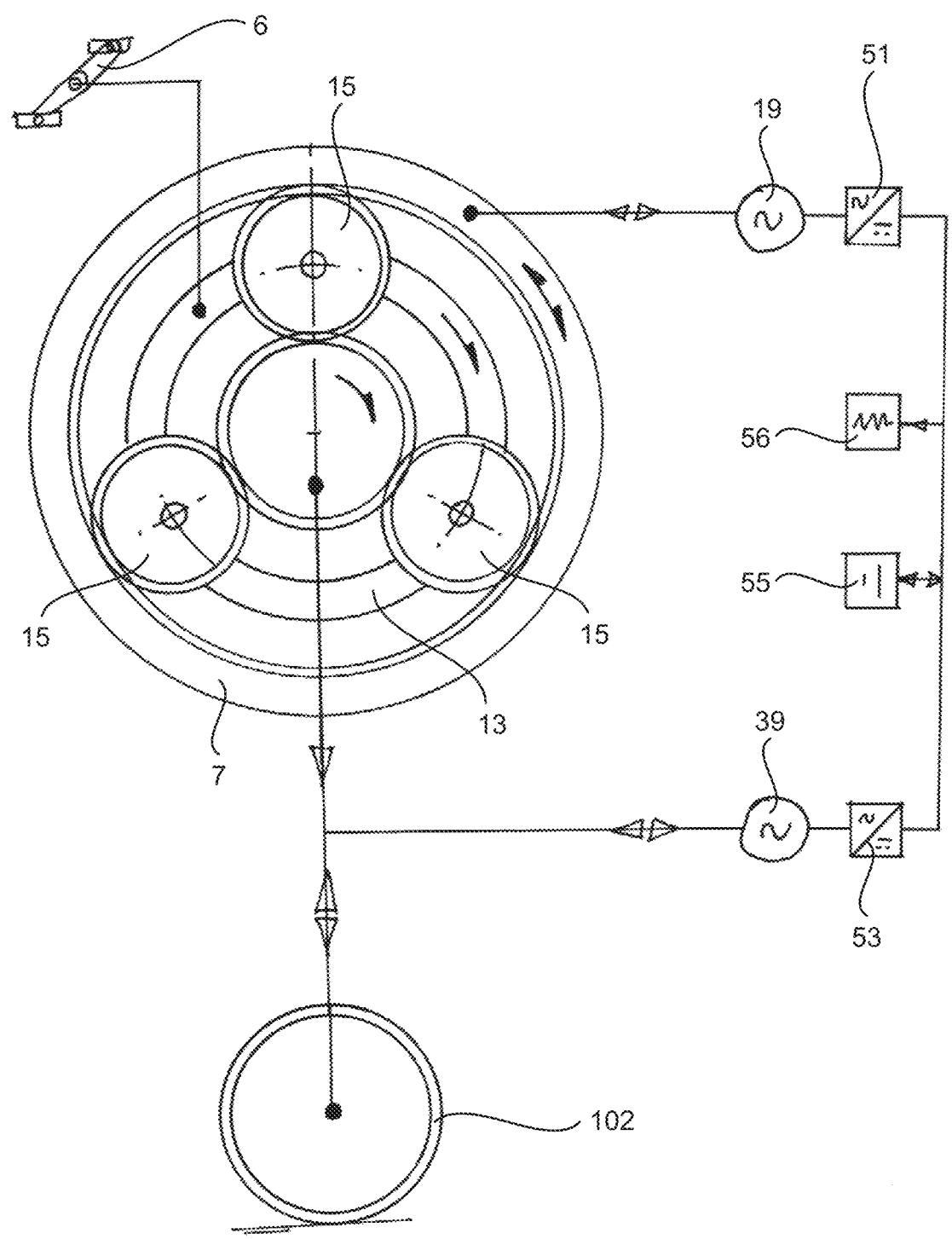
FIG. 4 is a schematic of the pedal cycle drivetrain, including a first and second electric motors and motor controllers.

The planet carrier 13 has a set of rotatably attached planet gears 15. As illustrated in FIG. 4, this example includes three planetary gears 15 that are equally spaced apart in an equilateral triangle arrangement and with the main axis 9 passing through the midpoint. The planetary gears 15 gears may be attached to the planet carrier 13 via bearings. In some variations, more or less planetary gears 15 may be used.

The teeth of the planetary gears 15 mesh with two other components of the epicyclic gear train 3, namely the sun gear 11 and the annulus 17 as shown in FIGS. 1 and 4. The planetary gear 15, sun gear 11 and the annulus 17 interact such that rotation of one will result in a corresponding rotation in at least one other component. This relationship and the resultant effective transmission ratio will be discussed in further detail below.

The annulus 17 may be an annular gear including an inwardly facing set of teeth 25 that meshes with the planetary gears 15. In this example, a portion of the first electric motor 19 in particular magnets 27 are fixed to a body 29 of the annulus 17. Corresponding windings 28 of the first electric motor 19 may be fixed to the frame 101. This arrangement may allow the first electric motor 19 to apply torque to the annulus 17. It is to be appreciated that other arrangements may also allow the first electric motor 19 to drive the annulus 17, for example the annulus 17 may have an outwardly facing set of teeth that is meshed with a pinion gear driven by an electric motor. In yet another alternative a motor may drive a pinion gear that meshes with the inwardly facing set of teeth 25.

The annulus 17 also has a friction surface 31 that operates as part of a clutch system. This includes a clutch body 33 mounted to the frame 101 that has movable clutch pad 35 selectively operable to contact the friction surface 31 to inhibit rotation of the annulus 17. The clutch 35 pad may be operable by various means including hydraulic piston(s), pneumatic piston(s), cables, pushrods, solenoid(s), etc. In some examples the clutch system may include a dog clutch. It is to be appreciated other ways of inhibiting rotation of the annulus 17 may be used, for example a movable pin may be used to lock and prevent rotation of the annulus 17 relative to the frame 101, alternatively a ratchet mechanism may be used to automatically prevent rotation in one direction. Inhibiting rotation of the annulus 17 can provide a fixed transmission ratio between the input 5 and the output 7 which will be discussed in further detail below.

The pedal cycle drivetrain 1 may further include an additional clutch system (not shown) to provide fixed transmission ratio of 1:1. The additional clutch system includes one or more clutches to effectively fix the sun gear 11, planet carrier 13 and annulus 17 relative to each other. The result is that one revolution at the input will correspond to one revolution at the output. Having a fixed transmission ratio of 1:1 may be advantageous in some circumstances, for example at low speed. It is to be appreciated that selective operation of the clutch system and/or additional clutch system in some examples may be selectively actuated via the control system. In some other examples, selective operation of the clutch system and/or additional clutch system may be manually operated by the user. In some examples, the selective operation may be provided by providing ratchet mechanism to prevent rotation in one direction and allowing rotation in another.

The sun gear 11 includes a set of outwardly facing teeth 37 that meshes with the planetary gears 15. In this example, the teeth 37 are fixed to the wheel hub 8 that rotates around the main axis 9. Therefore rotation of the planetary gears 15 may (depending on rotation of the annulus 17) cause corresponding rotation of the wheel hub 8 as the output of the pedal cycle drivetrain 1. The wheel hub 8 is part of the wheel 102, 202 that is driven to propel the human powered vehicle.

A second electric motor 39 is provided to rotate the wheel hub 8 around the main axis 9. A portion of the second electric motor 39, such as magnets 41 may be attached to the wheel hub 8. Corresponding windings 42 may be fixed to the frame 101. This second electric motor 39 may be used to directly drive the wheel hub 8 as an alternative means of rotating the output 7. It is to be appreciated that in some alternative examples, the second electric motor 39 may directly drive the crank 6, input 5, and/or the planet carrier 13 (where the crank, input and planet carrier may be in direct drive with one another).

The First Electric Motor 19 and Second Electric Motor 39

Referring to FIG. 4, the first electric motor 19 and the second electric motor 39 may be brushless motors that receive control outputs from corresponding motor controller 51, 53. The control outputs from the motor controllers 51, 53 to provide control the direction, speed, and/or torque that are output from the electric motors 19, 39. The motor controllers 51, 53 may include an inverter to output alternating current to the electric motors 19, 39 from a DC source.

The electric motors 19, 39 may be of a radial flux design or axial flux design.

The first electric motor 19 and/or the second electric motor 39 may be configurable to operate as electric generators to convert mechanical power from the rotating parts of the drivetrain 1. For example, the second electric motor 39 may convert kinetic energy, via the rotating wheel hub 8, into electric energy. In the case of a brushless motor, this may result in the production of three phase AC power. A rectifier may convert the AC power to DC which may, in turn, be used to charge an energy storage device 55, such as a battery or supercapacitor, so that the energy can be used by the electric motors 19, 39 at another time.

In some variations, the first electric motor 19 and/or second electric motor 39 may have a gear set between the motor and the epicyclic gear train. This may allow smaller, higher revolution per minute motors/generators to be used.

The battery may include multiple cylindrical battery cells. In one example, "18650" type cells have dimensions of approximately 18.3 mm in diameter and 65 mm in length. Such cells 107 may advantageously be stored within the tubular frame 101, 201 of the human powered vehicle 100, 200. Advantages of this may include safety, as the frame encloses the battery cells to minimise effects of external impact or internal fire. It may also allow integration into the frame design to make it more streamline and to reduce overall weight and interference with the rider. It may also allow a lower centre of gravity and moment of inertia. Depending on the material of the frame 101, 201, it may also allow the frame to act as a heatsink to disperse heat. Some further examples may include integrating an intermediary cooling fluid to further disperse the heat.

A resistor 56 or other electrically powered device may be incorporated to use power generated by the electric motors 19, 39 or provided by the energy storage device 55. The resistor may be useful to convert the generated electrical energy to heat, such that the electric motors 19, 39 and resistors act as a brake for the drivetrain 1. This may be useful for steep and extended hills where the power generated by the electric motors 19, 39 may be in excess of the charging capacity of the energy storage device 55.

Variable Transmission Ratio

The variable transmission ratio is achieved by selectively varying the angular velocity of one of the three main components of the epicyclic gear train (i.e. sun gear, planet carrier, or annulus), where the one of the three main components is the component is not in direct drive with the input 5 or output 7. In the example illustrated in FIG. 1, the variable transmission ratio is achieved by having the first electric motor 19 varying the angular velocity (which may include varying the direction) of the annulus 17.

Figure 6A:
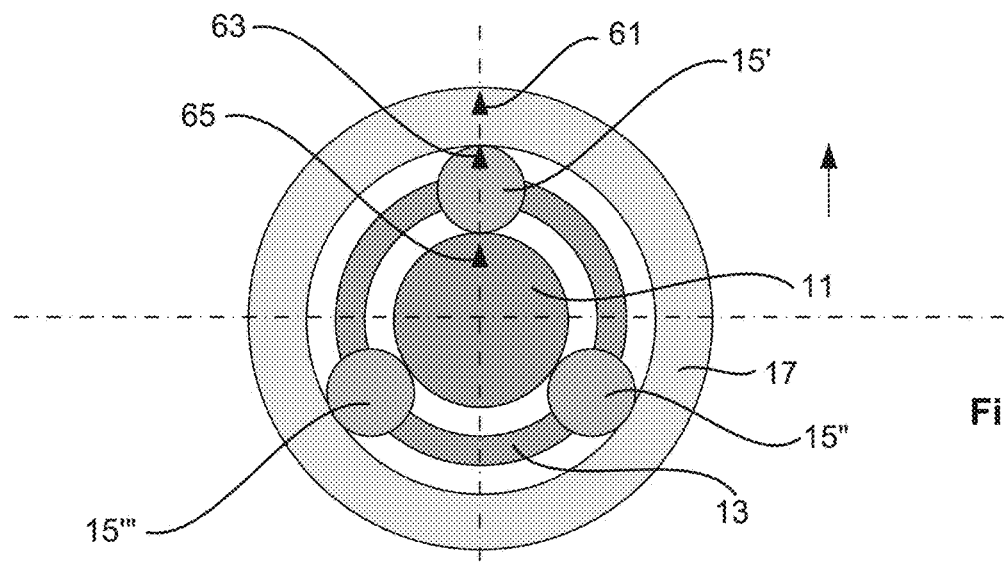
FIG. 6 show a sequence of the pedal cycle drivetrain with a stationary annulus.
Figure 6B:
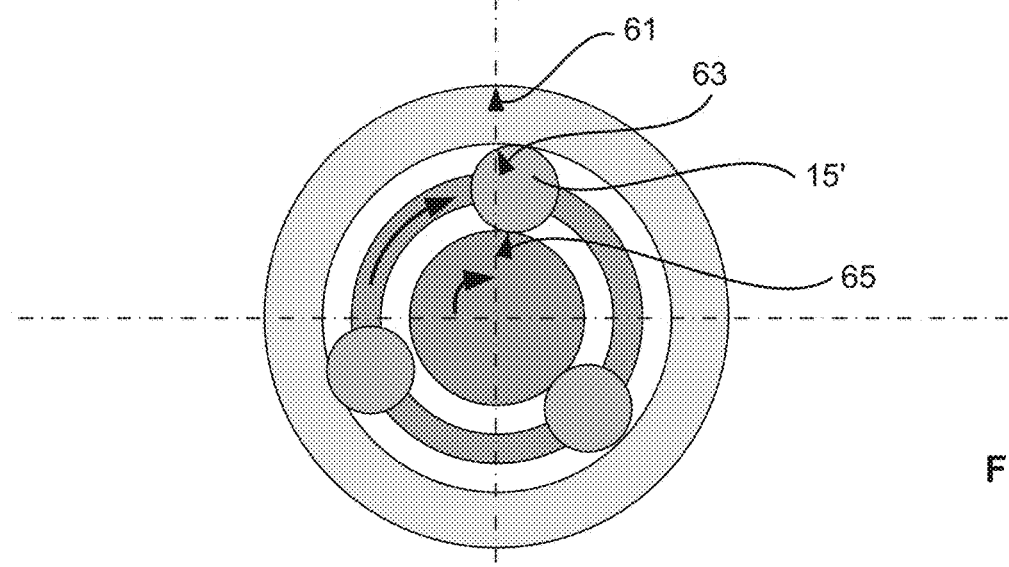
Figure 6C:
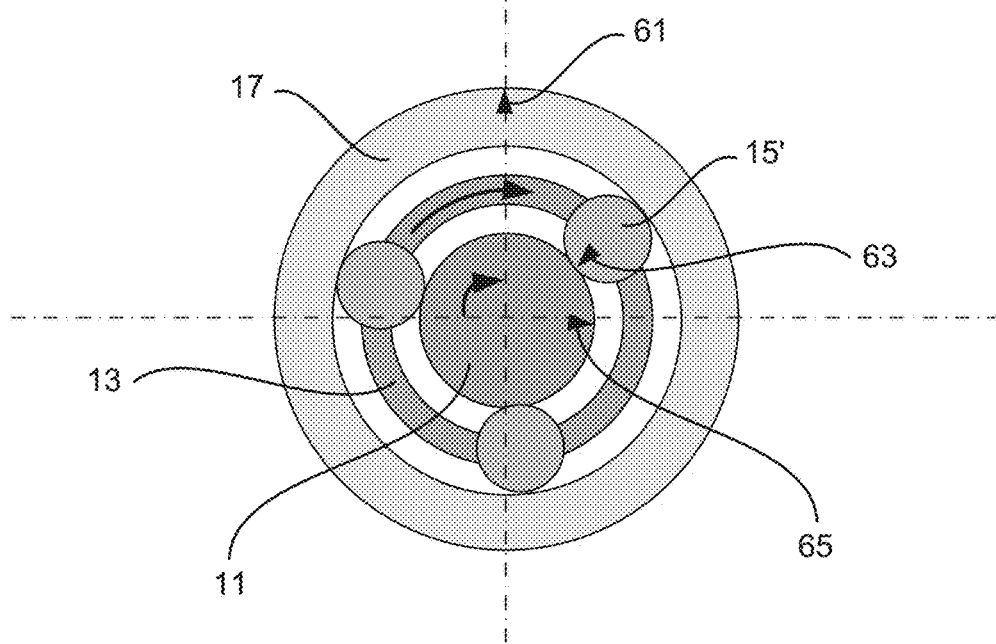

Turning to FIG. 6, this illustrates an example where the annulus 17 is stationary (e.g. if it was fixed to the frame 101). FIG. 6(a) shows the annulus 17, first planet gear 15' (associated with the planet carrier 13) and the sun gear 11 in a first orientation. Corresponding markers 61, 63, and 65 are provided to illustrate points on these respective components. FIG. 6(b) illustrates the planet carrier 13 rotated clockwise around the main axis which causes the axis of the first planet gear 15' to displace clockwise on an orbit around the main axis 9. Since the first planet gear 15' is meshed to the stationary annulus 17, this causes the first planet gear 15' to spin anticlockwise. In turn, the anticlockwise spin of the first planet gear 15' acts on the meshed sun gear 11 to cause the sun gear 11 to rotate clockwise around the main axis 9.

The effective transmission ratio in this case is fixed and a single revolution of the planet carrier 13 will result in a rotation of the sun gear 11 in a fixed proportion. The fixed effective transmission ratio when the annulus 17 is dependent on the number of teeth in the respective set of gears (and/or the size) of the annulus 17, planet gears 15, and sun gear 11. In the illustrated example, see FIG. 6(c), this shows that an input rotation (via the planet carrier) results in a correspondingly greater rotation at the output (via the sun gear 11). That is, an effective transmission ratio that is "A:1" where A is less than 1, since it takes less than one input rotation to cause a full revolution at the output.

Figure 7A:
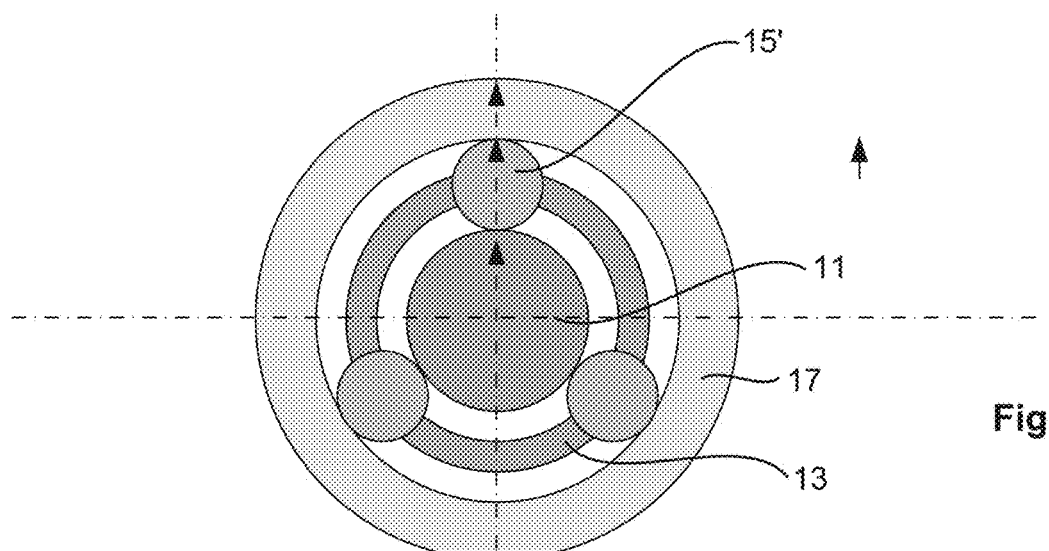
FIG. 7 show a sequence of the pedal cycle drivetrain with a rotating annulus.
Figure 7B:
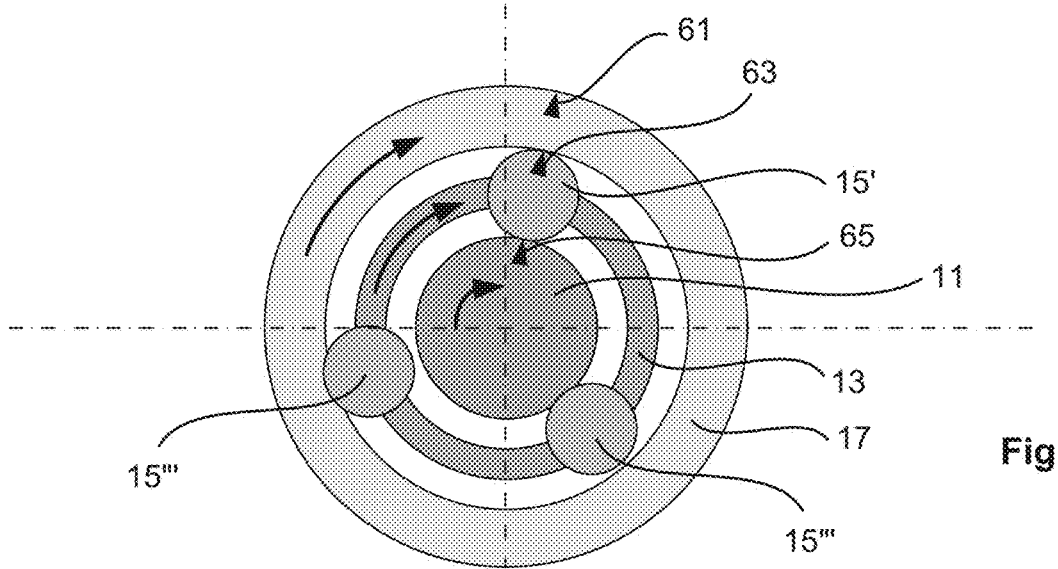
Figure 7C:
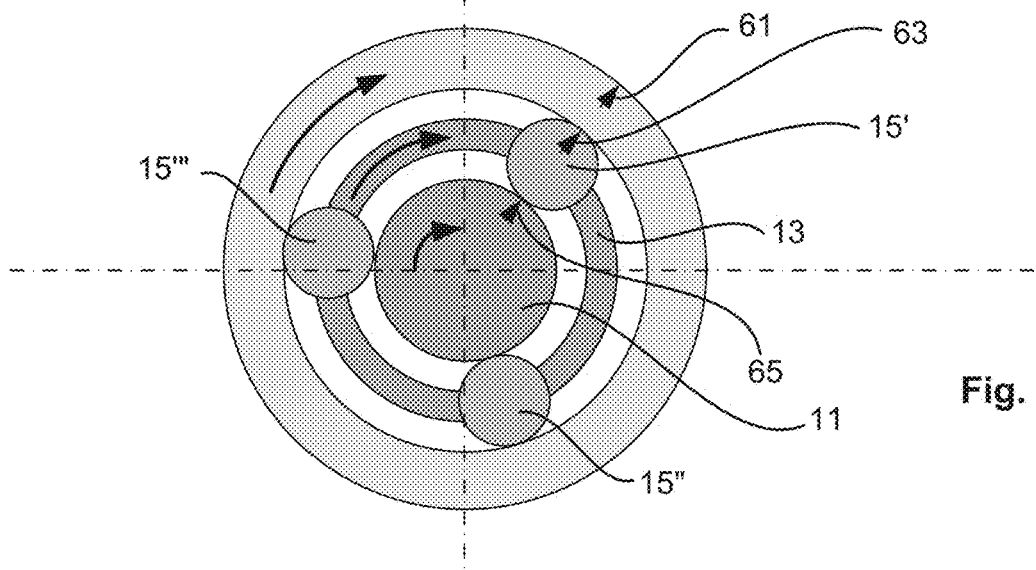

By rotating the annulus, effective transmission ratio can be changed. An example of this will now be described with reference to FIG. 7 where the annulus 17 is rotated around the main axis 9 in the same direction as the planet carrier 13. In this particular example, the annulus 17 is rotated at the same angular velocity as the planet carrier 13, such that the first planet gear 15' displaces clockwise on an orbit around the main axis 9. However, since the annulus 17 and planet carrier 13 are rotating at the same angular velocity, there is no relative motion to one another. This is illustrated by the corresponding markers 61, 63 that rotate together to the same angular displacement. The result is that the first planet gear 15' (nor planet gears 15". 15') do not spin on its rotatable axis on the planet carrier 13.

The planet gears 15', 15", 15'" orbit around the main axis 9 and mesh with the sun gear 11 to cause a corresponding clockwise rotation of the sun gear 11. Since the planet gears 15', 15", 15'" are not spinning, the planet gears mesh with the sun gear 11 at the same corresponding points. Accordingly, the sun gear 11 rotates around the main axis with the same angular velocity as the planet carrier 13 (and the annulus 17) as illustrated by markers 61, 63, 65 that rotate with one another. Therefore in this example the effective transmission ratio is unitary as one input revolution results in one output revolution.

The above examples illustrate how the effective transmission ratio can be changed by rotating (or fixing) the annulus 17. It is to be appreciated that other effective transmission ratios can be achieved by changing the angular velocity (including different directions). This allows seamless transition between transmission ratios as well as allowing infinitely variable effective transmission ratios.

It is to be appreciated that the effective transmission ratio may be the result of a number of factors. Firstly, it may be determined by the particular characteristics of the epicyclic gear train 3, such as the number of teeth of the sun gear 11, planet gear 15 and annulus 17. Secondly, the effective transmission ratio may be affected by the angular velocity of the input 5 and, as a consequence, the angular velocity of the planet carrier 13. The relationship for the present example may be expressed by Equation 1 below:

$$-\frac{N_a}{N_s} = \frac{\omega_s - \omega_c}{\omega_a - \omega_c} \quad \text{(Equation 1)}$$

where
$N_a$ is the number of teeth of the annulus
$N_s$ is the number of teeth of the sun gear
$\omega_s$ is the angular velocity of the sun gear (i.e. the output)
$\omega_c$ is the angular velocity of the planetary carrier (i.e. the input)
$\omega_a$ is the angular velocity of the annulus Therefore a desired planet carrier angular velocity $\omega_c$ (which corresponds to the pedal cadence in the present case) may be set by using a controller (such as a microcontroller) as discussed below to determine a suitable angular velocity $\omega_c$ for the annulus 17 (and corresponding effective transmission ratio) based on the measured angular velocity $\omega_s$ of the sun gear 11 (which is related to the angular velocity of the wheel).

To maximise the overall efficiency of the transmission it is advantageous to choose gear ratios that minimise the power that must be transferred through the electrical system at the most commonly used effective transmission ratios. For the present example this may be achieved by minimising the angular velocity of the annulus. Assuming the rider desires a cadence of 10 radians per second and the most common vehicle lateral velocity (on a flat road at typical rider power input for instance) equates to a wheel speed of 25 radians per second then setting w to zero in Equation 1 above, this will be achieved where $N_a = 1.5\ N_s$.

The Control System
Transmission Ratio

Figure 5:
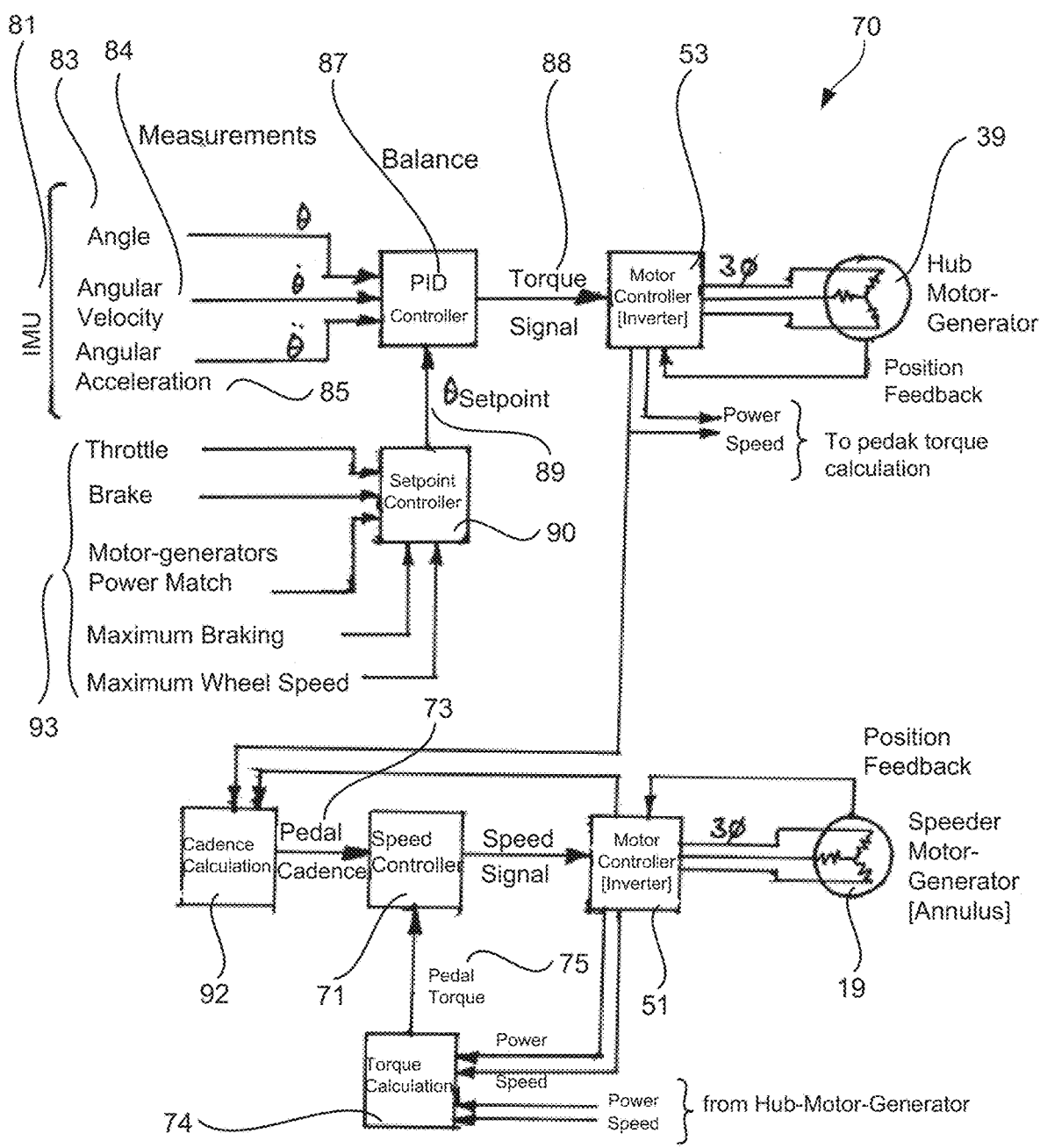
FIG. 5 is a schematic of a control diagram for a pedal cycle drivetrain.

An example control system 70 for the pedal cycle drivetrain 1 will now be described with reference to FIG. 5. The control system 70 is for a unicycle 100 and it is to be appreciated that some features may be removed, added, or adapted. The control system 70 may be housed in a control system housing 109 at the frame 101.

Firstly, the control system 70 may be used to provide a control output to provide a resultant effective transmission ratio from the range of possible variable transmission ratios. It is to be appreciated that the resultant effective transmission ratio caused by the control output of the control system 70 may be provided in a number of ways. In some examples, the control system may include a controller that calculates (or receives) a specific transmission ratio, and determines an angular velocity for the annulus 17 (with consideration for the angular velocity of the sun gear) to provide that specified effective transmission ratio. In other examples, the controller may not calculate or receive a specific effective transmission ratio (as an explicit value) but instead provide an effective ratio based on measurements and desired outputs (including set point values discussed below). For example, the controller may include a PID controller to provide the control output based on measurements and where the actual effective transmission ratio (in the sense of the actual values) are not necessarily explicitly calculated or provided. Thus it is to be appreciated that a specified transmission ratio does not necessarily need to be an explicit transmission ratio value but may instead be a specified transmission ratio that is specified indirectly.

In one example, the angular velocity of the planet carrier 13 is a factor for the resultant effective transmission ratio. Another factor is the angular velocity of the annulus 17, which can be selectively varied by controlling the first electric motor 19 that is in direct drive with the annulus 17. The first electric motor 19 may be controlled by the motor controller 51 that in turn may be controlled by a received speed set point value.

Figure 11:
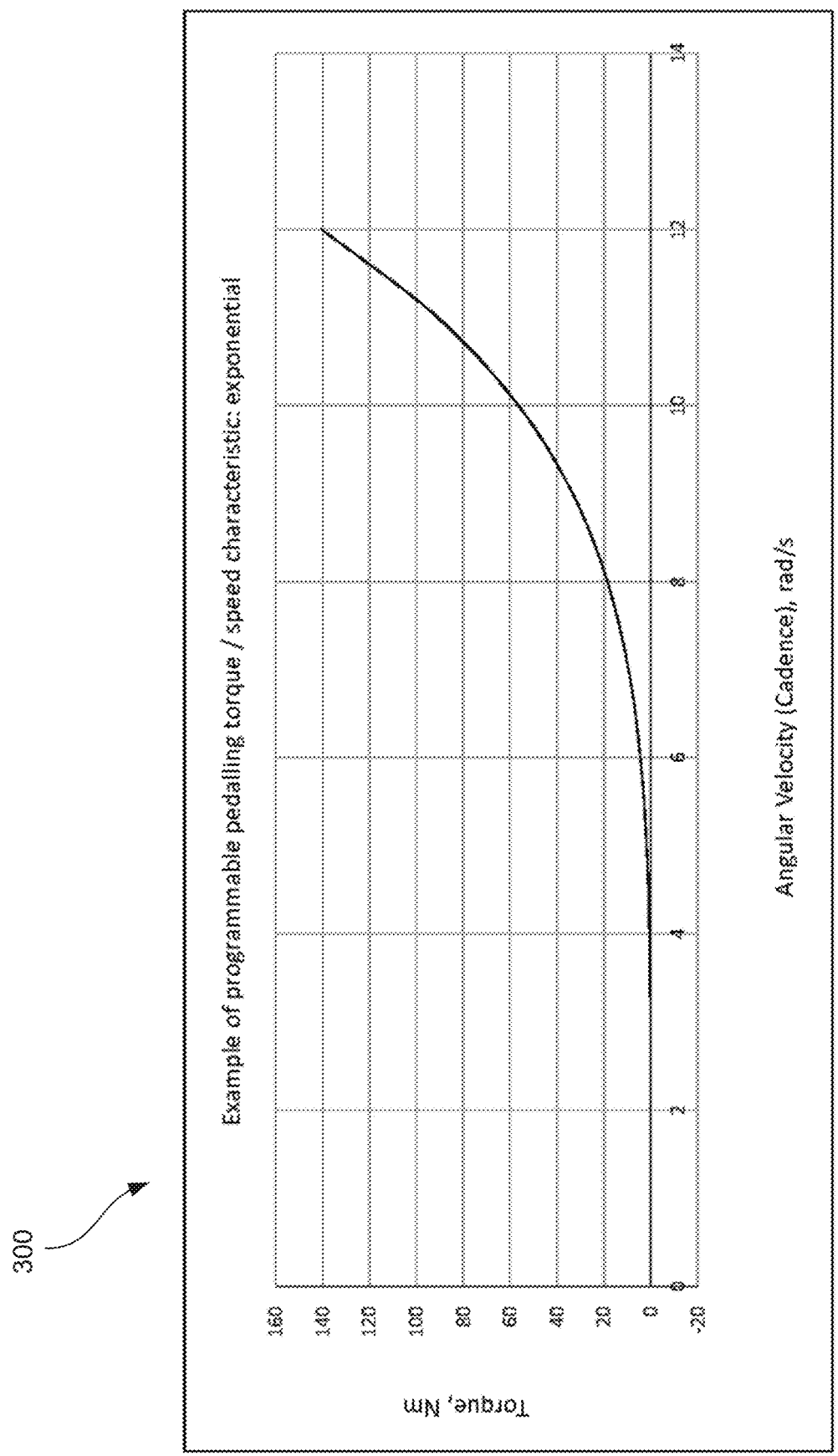
FIG. 11 is a graph showing an example of a torque and angular velocity profile for the pedal cycle drivetrain.

Determining the speed set point value for the motor controller 51 will now be described. Firstly, the angular velocity of the planet carrier 13 is determined, which may be based on a sensor information (such as from an encoder) to calculate, with a cadence calculation module 92, the pedal cadence 73. It is to be appreciated this may be derived in various ways, such as measuring the speed of the crank 6, spindle 23, planet carrier, angular velocity of the sun gear 11 planet carrier 13, first and second electric motors 19, 39 etc. The pedal cadence 73 is then provided to a speed controller 71. In addition, the pedal torque 75 may be used as a factor for determining an appropriate transmission ratio for a desired target pedal cadence. This may include calculating, with a torque calculation module 74, the pedal torque 75 based on sensor information (such as from a strain gauge on the cranks) or deriving torque based on information on the power and speed of second electric motor 39. The pedal torque 75 may also be provided to the speed controller 71 as a factor to determine an appropriate specified transmission ratio and a speed set point value for the motor controller 51 to achieve the specified transmission ratio (such as a required transmission ratio for the desired pedal cadence). In some examples, this may include matching the torque and pedal cadence to a desired torque curve as illustrated in FIG. 11.

In some examples, the user selects a desired transmission ratio. Thus a user interface may be provided to allow the user to input a desired transmission ratio, and the user interface in turn sends the input to the speed controller 71 to determine the appropriate speed set point value for the motor controller 51.

In some examples, the speed controller may determine that an appropriate specified transmission ratio (such as a required transmission ratio) would be achieved where the speed set point value provides a stationary (i.e. non rotating annulus 17). For efficiency, it may be desirable that maintaining a stationary annulus 17 is best achieved with the clutch system. Accordingly, the speed controller 71 may send an output to operate the clutch pad 35. Alternatively, the speed controller 71 may send an output to a user interface, such as a visual display or an audio speaker, to notify the user to operate the clutch system.

Balance Control

The control system 70 may also provide balance controller 87 which may be particularly useful for unicycles. This may be achieved by sending a balance control output from the motor controller 53 to the second electric motor 39, which in turn acts to apply torque and/or rotate the wheel hub 8 to balance the unicycle 100 around the main axis 9.

One or more inertial sensors may output inertial data 83, 84, 85. In some examples, this may include an inertial measurement unit (IMU) 81 that includes one or more of a gyroscope, accelerometer, or magnetometer. These sensors may be provided to provide inertial outputs 83, 84, 85 relevant to the main axis 9, or additional axes. The output of inertial data 83, 84, 85 may be sent to a balance controller 87 that compares an input balance set point 89 with the inertial data 83, 84, 85 and provides an appropriate balance signal 88 to the motor controller 53. In some cases, the balance signal 88 is based on a desired torque (including direction) to be applied by the second electric motor 39. The balance signal 88 is received by the motor controller 53 that in turn provides a balance control output to the second electric motor 39. The resultant torque and motion applied by the second electric motor 39 causes the wheel 102 to rotate to achieve balance around the main axis 9.

In some examples, more than one IMU 81, or components thereof, may be used. Multiple IMU may provide redundancy in case there is an error or failure of one or more of the sensors. Furthermore, the multiple IMU may be located at different parts of the vehicle 100, 200 such as at different locations at the frame 101, 201. For example, one set of sensors of the IMU may be located at the frame 101, 201 proximal to the main axis 9. Another set of the sensors of the IMU (or further IMU) may be located close to the saddle 105. This may allow improved determination of inertial data. For example, determining the difference between linear acceleration at sensors proximal to the main axis 9 and the saddle 105 can assist in providing information regarding the angular acceleration of a unicycle 100 around the main axis 9. This may be used independently or data fused with gyroscope data. Thus greater accuracy and sensitivity may be achieved with additional IMU and related sensors.

It is to be appreciated that the input balance set point 89 may vary depending on the conditions and mode the user wishes to operate the unicycle 100. The input balance set point 89 may be provided by a set point controller 90 that may take into account various conditions, measurements and modes of use. This will now be described with reference to FIG. 8.

Figure 8A:
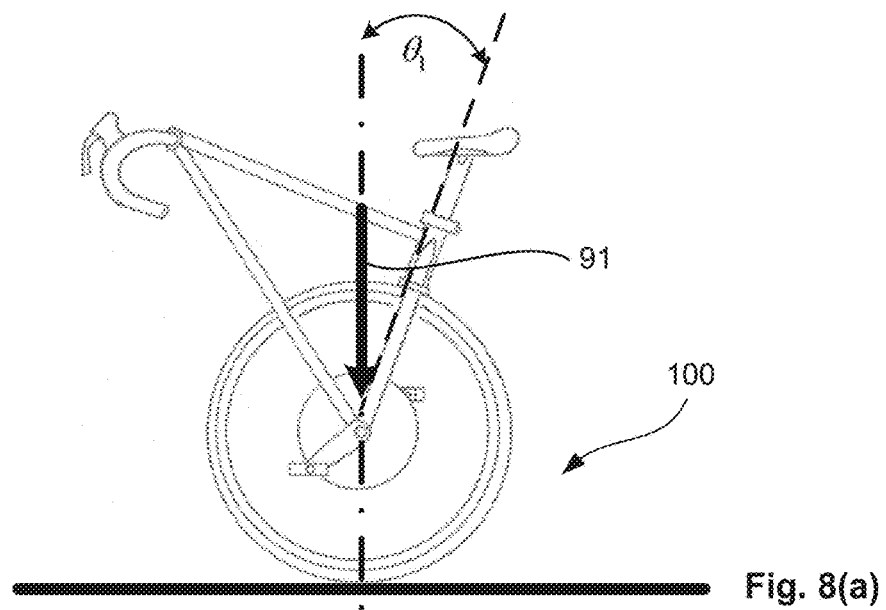
FIG. 8 show a unicycle balancing at various set points.
Figure 8B:
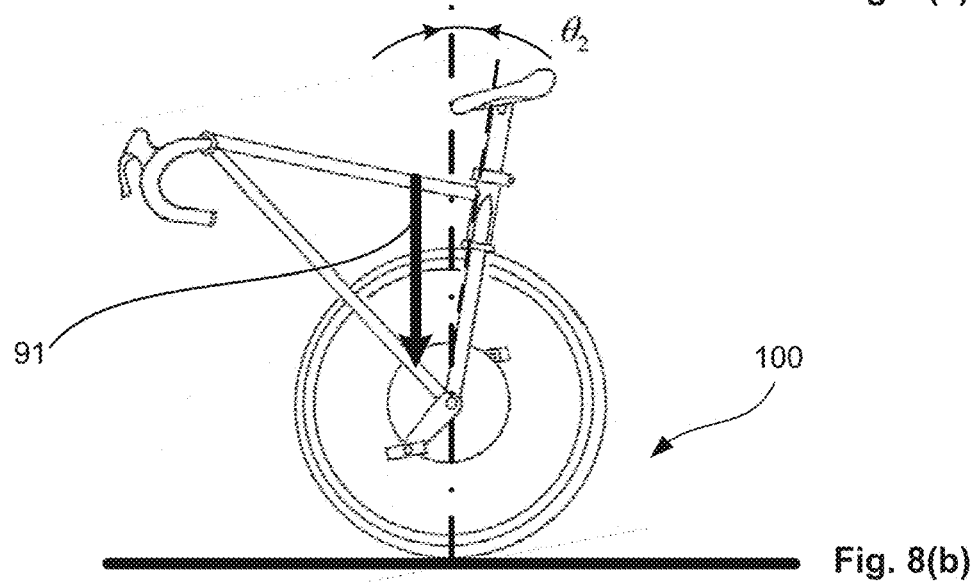
Figure 8C:
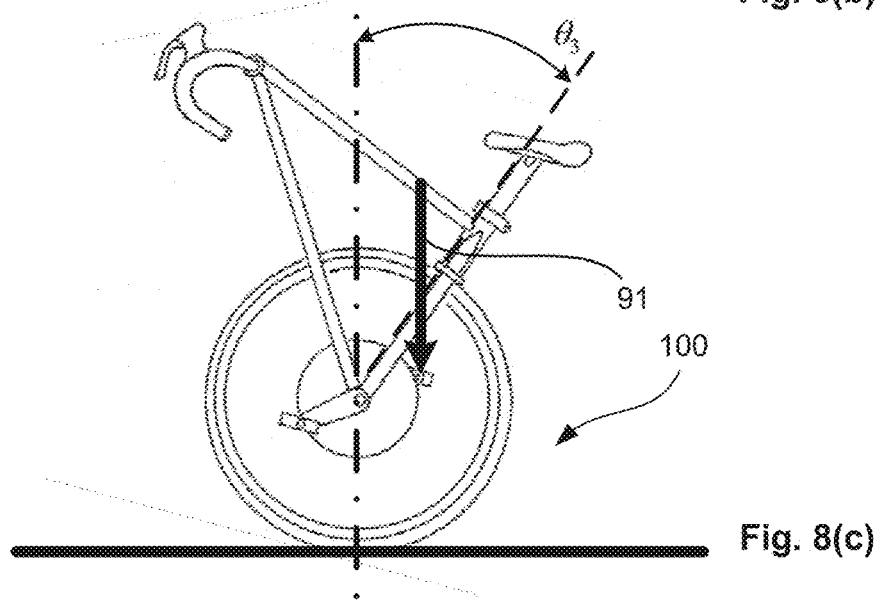

For example, if the user desires to maintain the lateral velocity of the unicycle 100 (either stationary or constant velocity), the input balance set point 89 may be selected such that the combined mass of the unicycle and user has a line of gravity 91 that substantially intersects the main axis. This is illustrated in FIG. 8(*a*) that shows the line of gravity 91 that passes vertically through the main axis 9. This corresponds to a set point angle $\theta_1$ that is the angle of a frame seat post extending from the main axis 9 with the vertical axis from the main axis 9. It is to be appreciated the set point angle can be relative to other features and parts of the unicycle and may be arbitrarily selected. Therefore having the set point controller 90 in a mode to provide an input set point 89 based on the set point angle $\theta_1$ will maintain the user and unicycle at constant velocity.

In one alternative, the unicycle may maintain a constant set point angle $\theta_1$ during acceleration. For example, the user may lean forward and the set point angle $\theta_1$ of the frame of the unicycle 100 relative to the vertical is not changed (but the combined line of gravity of the unicycle and user will change and be forward of the main axis 9). In order to balance in this position (i.e. to maintain the constant set point angle $\theta_1$) a torque must be applied to the wheel and the unicycle will therefore accelerate. A similar principle applies in reverse if the user leans backwards to decelerate. Over the longer term (e.g. 60 seconds) it may be desirable to reset the set point angle $\theta_1$ so that the unicycle does not attempt to accelerate or decelerate to perpetuity and the unicycle can easily be ridden at constant speed by people with different weight distributions or riding positions.

Another alternative of acceleration and deceleration will now be described. The control system 70 (either due to throttle/brake input or automatically) changes the set point angle of the frame relative to vertical (and where the user's body position relative to the frame does not substantially change) to balance the unicycle. In this case the unicycle will also accelerate or decelerate as above. In such examples, there may be no time limitations for acceleration or deceleration, however other limitations may still apply including maximum speed and preventing the reverse motion.

Yet another alternative will now be described. When the user wants to accelerate, it may be desirable for the user to lean forward such that the combined mass of the unicycle and user has a line of gravity 91 that is forward of the main axis 9 along the direction of travel. This is illustrated in FIG. 8(*b*) that shows the line of gravity 91 that passes forward of the main axis 9 and with a corresponding set point angle $\theta_2$ that is smaller than $\theta_1$. Therefore if the set point controller 90 determines that a mode to allow the user to lean forward is desired, the set point controller 90 may provide an input set point 89 based on a set point angle $\theta_2$ to allow the user and unicycle to lean forward. When the user wants to slow down, or during descent of a hill, it may be desirable for the user to lean back such that the combined mass of the unicycle and user has a line of gravity 91 that is rear of the main axis 9 along the direction of travel. This is illustrated in FIG. 8(*c*) that shows the line of gravity 91 that passes rearwards of the main axis 9 and with a corresponding set point angle $\theta_3$ that is larger than $\theta_1$. Therefore if the set point controller 90 determines that a mode to allow the user to lean backwards is desired, the set point controller 90 may provide an input set point 89 based on a set point angle $\theta_3$ to allow the user and unicycle to lean backwards.

The set point controller 90 may determine the desired (acceleration or deceleration) mode in a number of ways. Firstly, the user may operate a user interface to select the desired mode of use which in turn is sent to the set point controller. In other examples, the set point controller 90 may determine the desired mode based on information received from one or more sensors, including the IMU, or other components such as the torque calculation module 74.

For example, if it is determined that the user is providing a high value of torque to the pedals, this may be indicative of vigorous pedalling and the set point controller 90 may determine that the user and unicycle should lean forward. In another example, if it is determined that the operator has applied the brakes, the set point controller may determine that the user and unicycle should lean backwards. Similarly, if the set point controller determines that the power being provided by the rider is equal to that being used to propel the vehicle (i.e. current vehicle velocity is desirable), then the set point controller may determine that no leaning is required and that the line of gravity 91 should pass through the main axis 9.

The set point controller 90 may take other factors into account, such as maximum allowable braking, maximum wheel speed, maximum speed downhill, an amount of braking applied, an amount of power applied (or generated) by the electric motors 19, 39, characteristics of the user, etc.

In summary, the set point controller 90 may take a variety of inputs for controlling speed including: (i) determining that the user wants to control speed by shifting weight (e.g. leaning forwards and backwards); (ii) receiving an input from a throttle controller and/or brake lever; (iii) reference to programmed thresholds for limiting maximum speed, etc. which may include overriding (i) and (ii).

It is to be appreciated that the controllers and modules 51, 53, 71, 74, 87, 90, 92 described herein are described with reference to their function. In some examples, two or more controllers and modules may be integrated into a single controller unit. Conversely, the function of one of the controllers or modules may be divided to multiple controllers. In some examples, this may be used to provide redundancy.

In some alternatives, the control system 70 may utilise programmable rider input torque/speed curves that are used for calculating the speed set point. These could for instance provide characteristics such as constant torque (similar to a fixed gear), constant cadence (automatic), a droop characteristic that increases torque with speed, a mode for standing on the pedals off the saddle, freewheeling and other automatic or selectable modes to suit rider preference. Pedal (planet carrier) cadence can be calculated from wheel and annulus angular velocity (known from the motor/generators) and torque can be calculated from this and the motor generator powers (which are known from the motor generator controllers). These are powerful features that are beyond conventional bicycle transmissions.

FIG. 11 illustrates a graph 300 of an example of a programmable pedalling torque and speed curve for calculating the speed set point. This includes a vertical axis for torque and a horizontal axis for angular velocity of the input which is the pedal cadence.

In some alternatives, the control system 70 may be configured and programmed to facilitate balancing in the lateral axis (roll) by controlling the speed of the vehicle (via the forward lean parameter). If for any given radius of turn (yaw) the lateral lean angle from vertical (roll) is too great for centripetal force to balance the gravitational force then the control system can be configured to accelerate the vehicle's velocity and increase centripetal force. Conversely, if the turn is too sharp to balance the lean then the control system can be configured to reduce vehicle speed to approach the balancing point.

Variation
Variation of a Pedal Cycle Drive Train

Figure 10:
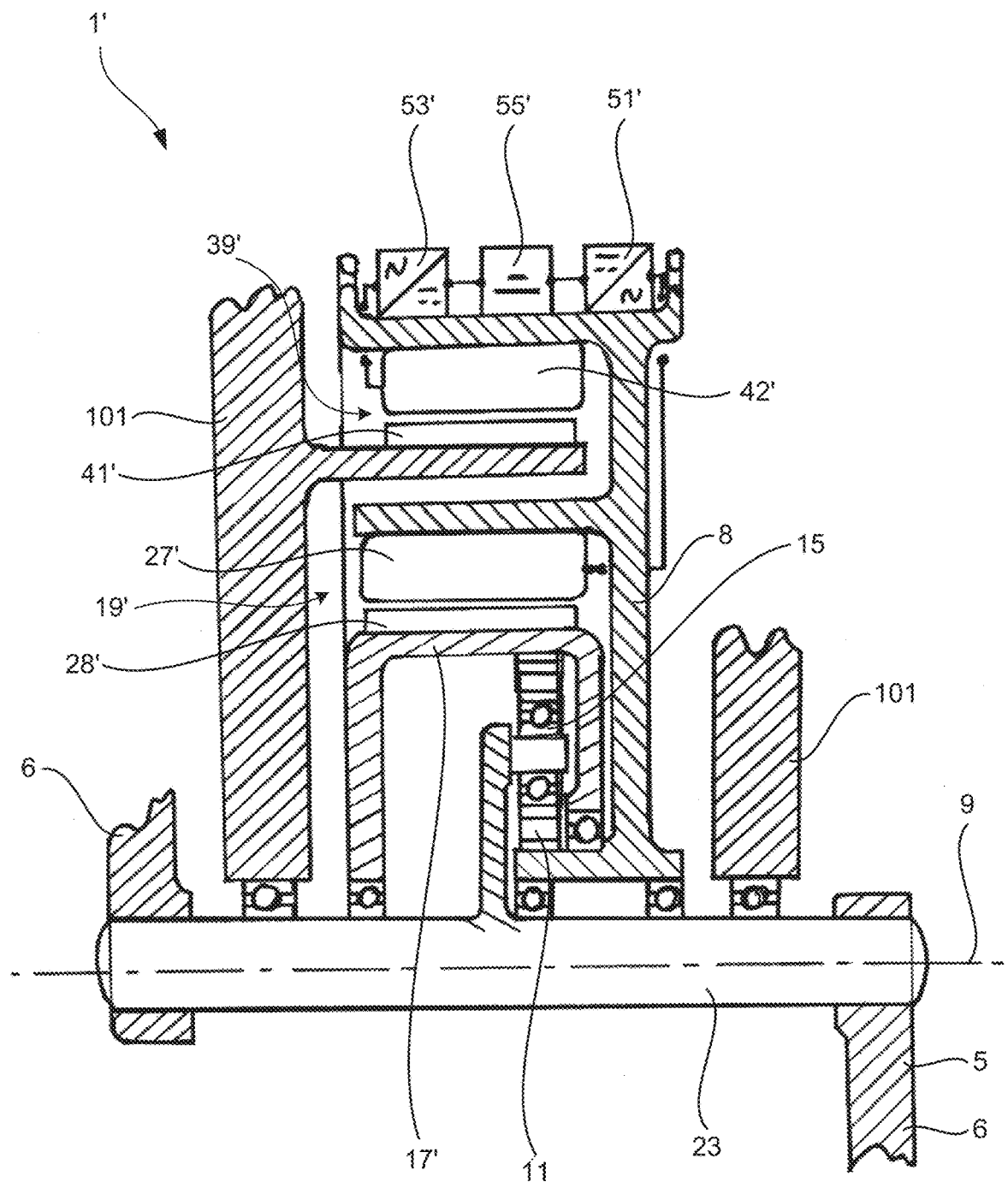
FIG. 10 is a cross-sectional view of a variation of the pedal cycle drivetrain with an energy storage device and other components in the wheel.

FIG. 10 illustrates a variation of the pedal cycle drivetrain 1 that includes reconfigured first and second electric motors 19', 39' as well as having the energy storage device 55' mounted on the wheel hub 8.

In this example, the first electric motor 19' includes windings 27' mounted to the wheel hub 8 and windings 28' mounted to the annulus 17'. Thus the first electric motor 19' may apply torque between the hub 8 and the annulus 17' (and may also generate electricity).

The second electric motor 39' includes magnets 41' mounted to the frame 101 and windings 42' mounted to the wheel hub 8. Thus the second electric motor 39' may apply torque between the wheel hub 8 and the frame 101 (and in some circumstances generating electricity).

The wheel hub 8 may include the motor controllers 51', 53' for controlling, respectively, the first electric motor 19' and second electric motor 39'. The motor controllers 51', 53' may in some examples be in communication with other parts of the control system 70 wirelessly (such as by radio transmission that may include using the Wi-Fi or Bluetooth protocols). In other examples, the motor controllers 51', 53' may be in communication with other parts of the control system 70 via slip rings. In yet other examples, the control system 70 may also be mounted on the wheel hub 8.

The energy storage device 55' may include a battery (or a plurality of batteries) that are distributed around the wheel hub 8 or wheel rim. In some examples, it is desirable to distribute the additional mass of the energy storage device 55' (and other components such as the motor controllers 51', 53') evenly around the wheel hub 8 to balance the wheel 102.

Including the mass of the energy storage device 55' and other components as part of the spinning mass of the wheel hub 8 may advantageously maintaining stability of the vehicle as this may increase the angular momentum and gyroscopic effect of the wheel.

Variation of the Unicycle 400

A variation of the unicycle 400 will now be described with reference to FIGS. 12a to 13c. The unicycle 400 includes a frame 401 where balancing of the unicycle may also be facilitated by allowing the main wheel 402 to turn left and right in a similar fashion to the front wheel of conventional bicycle (e.g. Rover safety bicycle).

Figure 12A:
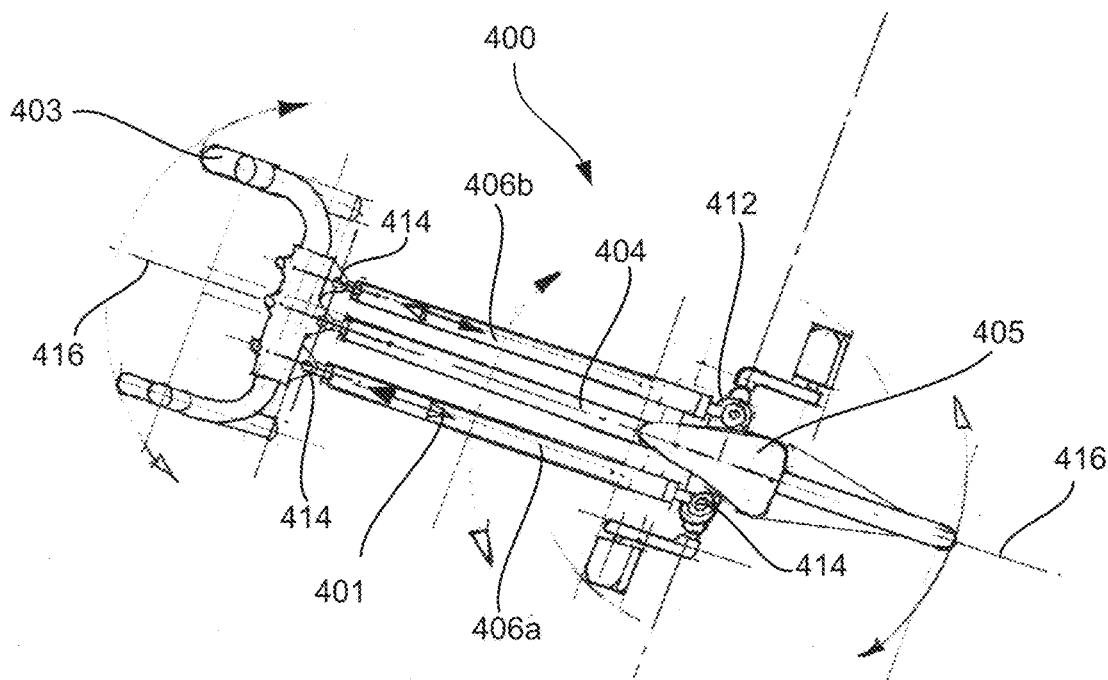
FIGS. 12a and 12b illustrate top and side views of another example of a unicycle having a steering mechanism.
Figure 12B:
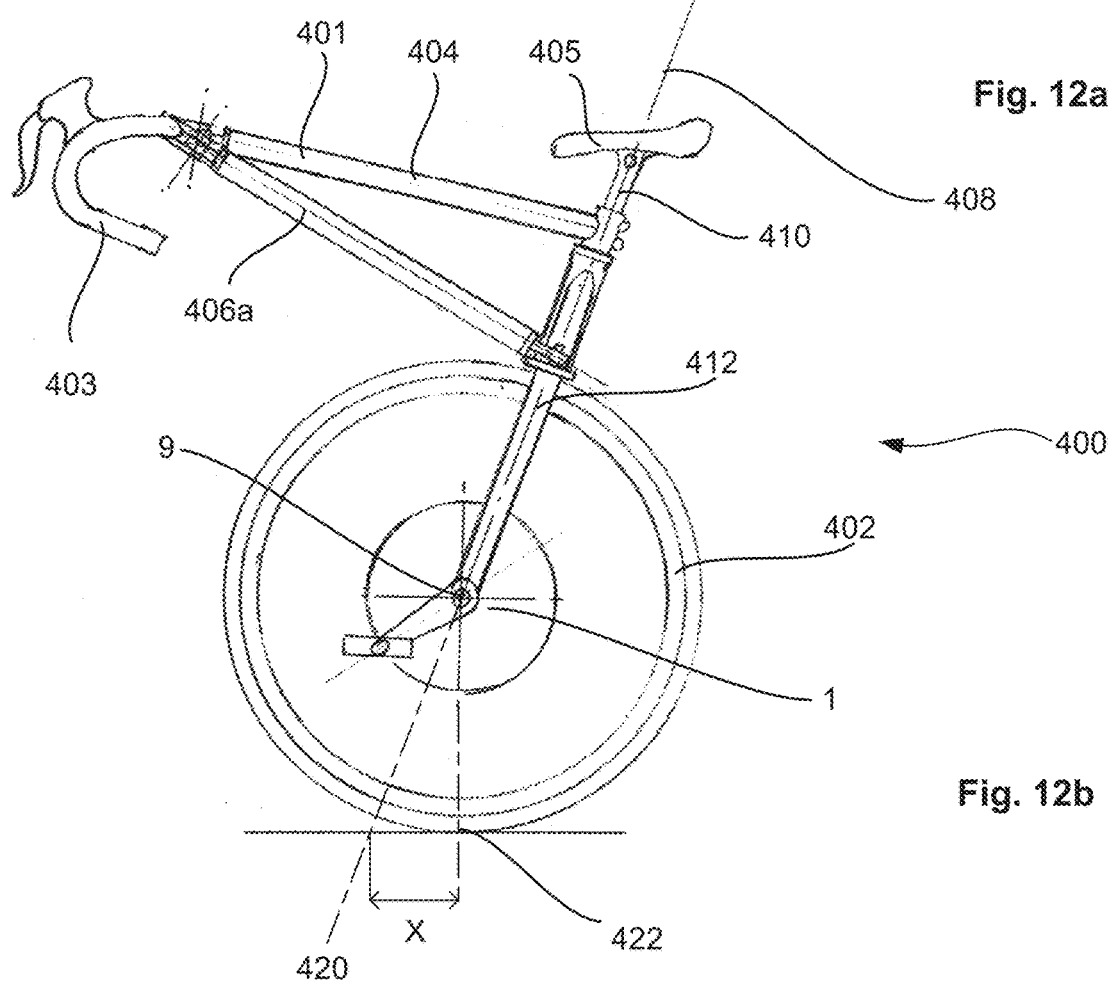

FIGS. 12a and 12b show such a configuration of a unicycle 300, with the seat 405, top tube 404 and rider (not illustrated) forming a more stable reference plane 416 whilst fork assembly 412 and wheel 402 are able to turn in bearings about an axis 408 close to that of seat tube 410. The frame members (including top tube 404 and lateral arm tubes 406a, 406b) use ball joints 414 to link the motion of the handlebars 403 to the fork assembly 412 and wheel 402 and to allow control by the rider. Selection of the inclination of the fork rotation axis 408 (i.e. the rake angle) and relative offset between the fork rotation axis 408 and the main axis 9 are design considerations influencing vehicle stability and manoeuvrability. In particular, this may affect an amount of trail X from an intersection 420 of the fork rotation axis 408 meeting the ground to a contact patch 422.

Figure 13A:
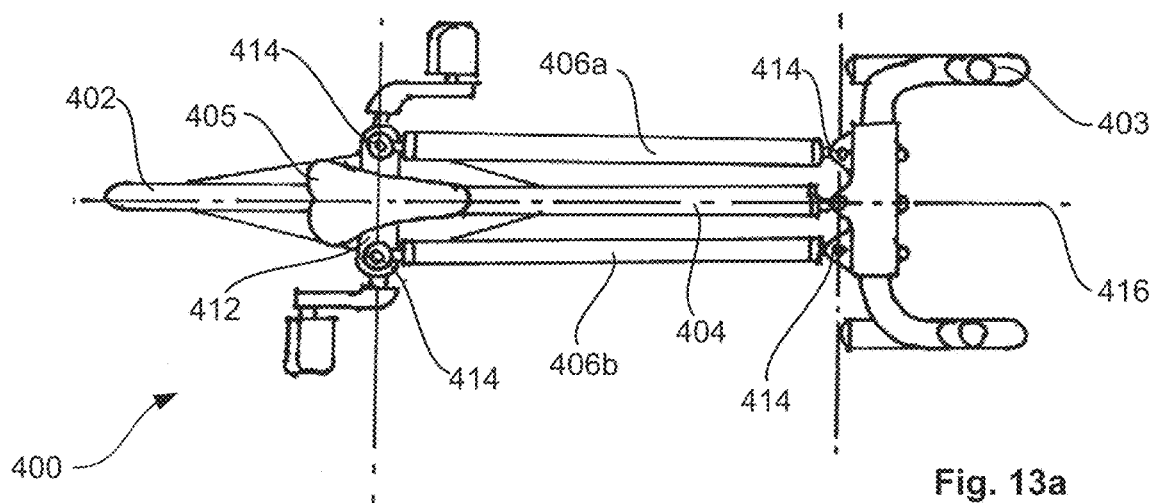
FIGS. 13a to 13c illustrate top view of a sequence of the steering mechanism in FIGS. 12a and 12b configured to steer in various directions.
Figure 13B:
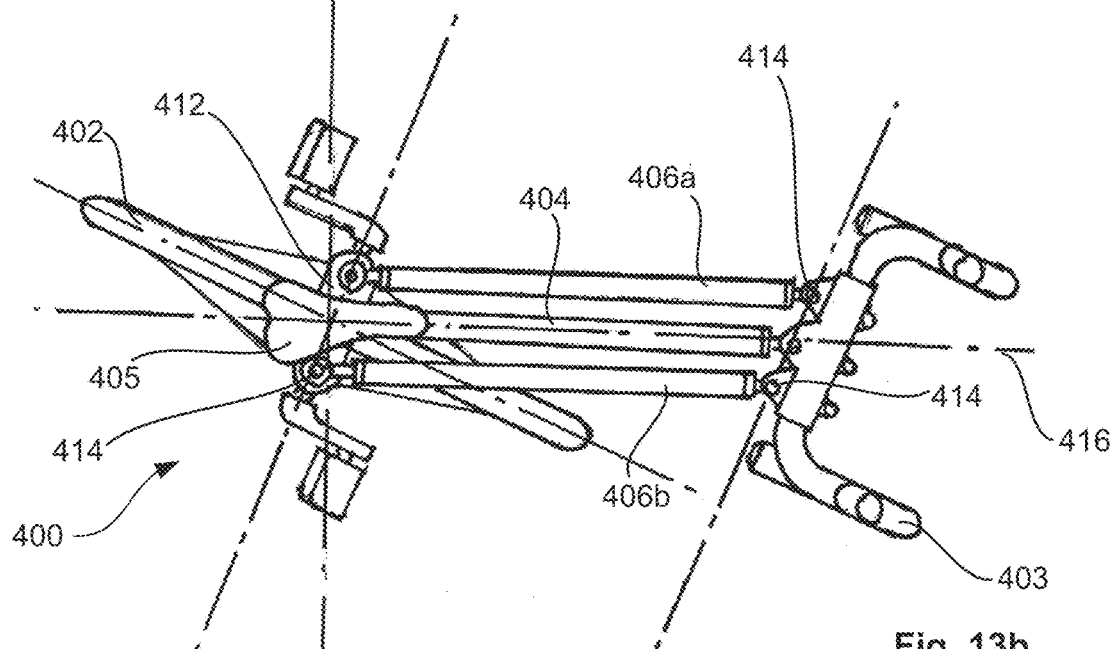
Figure 13C:
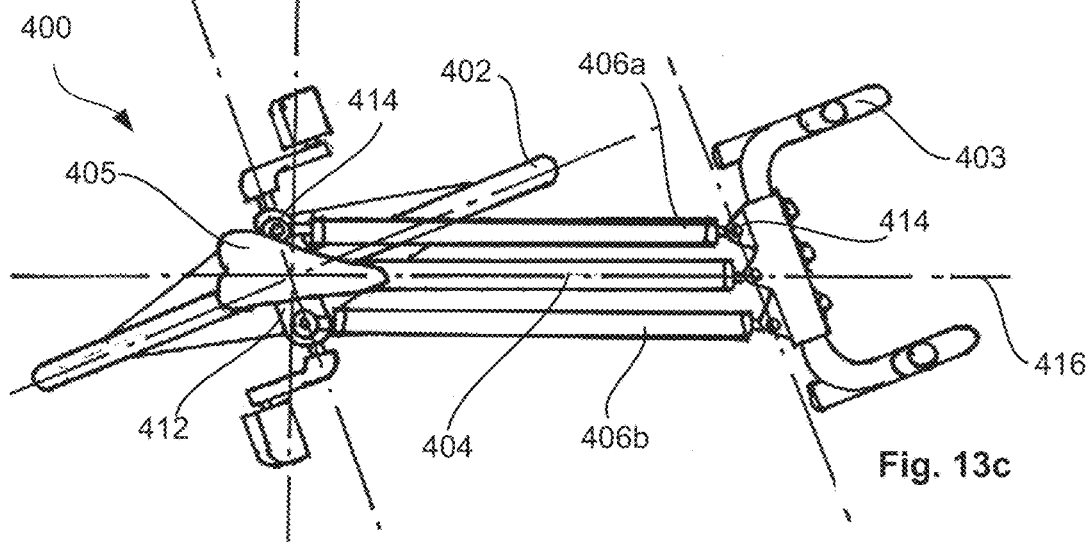

FIGS. 13a to 13c illustrate how orientation of the handlebars 403 affect the direction of the wheel 402. FIG. 13a is a top view that illustrates the handlebars 403 at a neutral position such that the wheels are orientated to be parallel with the reference plane 416. FIG. 13b illustrates the handlebars 403 directed to a right direction that causes the wheel 402 to be orientated right for a right turn. Conversely, FIG. 13c illustrates the handlebars 403 directed to a left direction that causes the wheel 402 to be orientated left for a left turn.

The Human Powered Vehicle

FIGS. 2 and 3 illustrate examples of human powered vehicles 100, 200 having the pedal cycle drive train 1 described above. It is to be appreciated that human powered vehicles are not limited to the unicycle 100 and recumbent bicycle 200 illustrated and may include other vehicles such as tricycles, or vehicles with additional wheels.

Such human powered vehicles 100, 200 are not limited to only the features described herein and it is to be appreciated these vehicles may incorporate other features. For example, a friction braking system (such as disc brakes, cantilever brakes, etc) to provide another means of slowing and stopping the human powered vehicle 100, 200. It is to be appreciated that these other features could be integrated with the above mentioned features.

For example, the friction braking system may be an electronically controlled braking system (such as via servos or solenoid actuators) that can be operated by one or more of the controllers and modules 51, 53, 71, 74, 87, 90, 92. This may be useful if it is determined that additional braking capacity is required and it will be safer and/or more efficient to utilise the friction brake.

In another example, the wheel hub 8 may include a freewheel mechanism (such as a ratchet) so that if the user stops pedalling (or pedals slowly in a first direction) the wheel 102, 202 can continue spinning. This may also reduce, limit or prevent transmission of torque in the opposite direction if a user attempts to pedal backwards (i.e. in a second direction opposite to the first direction).

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A pedal cycle drivetrain comprising:
   an epicyclic gear train comprising:
      a sun gear rotatable around a main axis;
      a planet carrier rotatable around the main axis and carrying one or more planet gears meshed with the sun gear; and
      an annulus rotatable around the main axis and meshed with the one or more planet gears;
   wherein the sun gear, the planet carrier, and the annulus are each exclusively in drive with one of:
      an input including one or more pedals, rotatable around the main axis, wherein the input is in direct drive with a respective one of the sun gear, the planet carrier, or the annulus;
      an output including a wheel hub rotatable around the main axis, wherein the output is in direct drive with a respective one of the sun gear, the planet carrier, or the annulus; and
      a first electric motor,
   wherein varying angular velocity of the first electric motor corresponds to a varying effective transmission ratio between the input and the output.

2. A pedal cycle drivetrain according to claim 1 further comprising:
   a controller to control the transmission ratio, wherein the controller provides a control output to cause the first electric motor to rotate the annulus at a specific angular velocity, wherein the specific angular velocity provides a required transmission ratio.

3. A pedal cycle drivetrain according to claim 1 further comprising a second electric motor to drive the wheel hub around the main axis; wherein:
   the second electric motor is also configurable as an electric generator in direct drive with the wheel hub to generate electrical energy from a rotating wheel hub and at least part of the electrical energy from the electric generator is transferred to power the first electric motor; or
   the first motor is also configurable as an electric generator to generate electrical energy from a rotating wheel hub and at least part of the electrical energy from the electrical generator is transferred to power the second electric motor.

4. A pedal cycle drivetrain according to claim 3 further comprising an energy storage device,
   wherein the energy storage device is configurable to receive at least part of the electrical energy from the electric generator; and
   wherein the energy storage device is configurable to supply electrical energy to the first and/or second motors.

5. A pedal cycle drivetrain according to claim 4, wherein the wheel hub is part of a wheel, and wherein at least part of the energy storage is mounted to the wheel.

6. A pedal cycle drivetrain according to claim 1 wherein the first electric motor is configurable as an electric generator to generate electrical energy, and wherein the generated electrical energy is transferred to power the first electric motor.

7. A pedal cycle drivetrain according to claim 1 further comprising an additional generator in direct drive with any one of the sun gear, planet carrier or the annulus to generate electrical energy.

8. A pedal cycle drivetrain according to claim 1 further comprising a selectively operable clutch, wherein the clutch inhibits rotation of one or more of the sun gear, planet carrier and annulus.

9. A pedal cycle drivetrain according to claim 8, wherein the clutch prevents rotation around the main axis of one of the sun gear, the planet carrier or the annulus that is in drive with the first electric motor to provide a fixed transmission ratio between the input and output.

10. A pedal cycle drivetrain according to claim 1 further comprising an additional clutch, wherein the additional clutch is selectively operable to fix relative rotation of the sun gear, planet carrier an annulus to each other.

11. A pedal cycle drivetrain according to claim 1 wherein the wheel hub is selectively operable to be in direct drive with the output via a ratchet such that:
   torque is transferred to the output around a first direction; and
   reducing, limiting, or preventing torque to be transferred to the output around a second direction that is opposite to the first direction.

12. A unicycle comprising:
   a pedal cycle drivetrain according to claim 1;
   a wheel in direct drive with the output of the pedal cycle drivetrain; and
   a frame mounted to the pedal cycle drivetrain wherein the frame supports a user.

13. A unicycle according to claim 12 further comprising:
   at least one inertial sensor to output inertial data;
   a balance controller, in a first mode, to send a balance control output based on at least the inertial data and a first set point; and
   a second electric motor to drive the wheel hub around the main axis, wherein the second electric motor rotates the wheel hub based on the balance control output to balance the unicycle around the main axis to the first set point.

14. A unicycle according to claim 13 wherein the balance controller, in a second mode to traverse in a direction of travel, further sends a second control output based on at least the inertial data and a second set point,
   wherein the second electric motor drives the wheel hub based on the second control output to balance the unicycle around the main axis to the second set point, wherein the second set point corresponds to a combined unicycle and user having a centre of mass that is forward of the main axis along the direction of travel,
   wherein the balance controller, in a third mode to traverse in a direction of travel, further sends a third control output based on at least the inertial data and a third set point,
   wherein the second electric motor applies torque to the wheel hub, based on the third control output, to balance the unicycle around the main axis to the third set point, wherein the third set pint corresponds to a combined unicycle and user having a centre of mass that is rearward of the main axis along the direction of travel.

15. A unicycle according to claim 13 further comprising:
a set point controller to determine one or more of the modes based on input from a user interface and/or data from the at least one or more inertial sensors,
wherein an indication of the one or more modes are sent to the balance controller.

16. A unicycle according to claim 15, wherein the set point controller further determines one or more of the set points based on input from the user interface, data from the at least one or more inertial sensors, and/or the determined mode,
wherein the one or more set points are sent to the balance controller.

17. A unicycle according to claim 12 wherein the frame comprises:
a seat tube supporting a seat;
a fork assembly rotatable relative to the seat tube along the fork rotation axis wherein the pedal cycle drivetrain and wheel are mounted to the fork assembly;
a handlebar assembly; and
a rod or frame member linking the handlebar assembly to the fork assembly, wherein movement of the handlebar assembly causes a corresponding rotation of the fork assembly relative to the seat.

18. A human powered vehicle comprising a pedal cycle drivetrain according to claim 1.

19. A human powered vehicle according to claim 18 wherein the human powered vehicle is a recumbent bicycle or tricycle.

20. A pedal cycle drivetrain comprising:
an epicyclic gear train comprising:
a sun gear rotatable around a main axis;
a planet carrier rotatable around the main axis and carrying one or more planet gears meshed with the sun gear; and
an annulus rotatable around the main axis and meshed with the one or more planet gears;
an input including one or more pedals in direct drive with the planet carrier;
an output including a wheel hub rotatable around the main axis, the wheel hub including, or in direct drive with, the sun gear; and
a first electric motor to drive the annulus around the main axis, wherein varying angular velocity of the annulus corresponds to a varying effective transmission ratio between the input and the output.

\* \* \* \* \*